United States Patent
Kim et al.

(10) Patent No.: US 11,034,132 B2
(45) Date of Patent: Jun. 15, 2021

(54) HIGH MANGANESE HOT DIP ALUMINUM-PLATED STEEL SHEET HAVING EXCELLENT SACRIFICIAL CORROSION RESISTANCE AND PLATABILITY AND MANUFACTURING METHOD THEREFOR

(71) Applicant: POSCO, Pohang-si (KR)

(72) Inventors: Young-Ha Kim, Gwangyang-si (KR); Chang-Sik Choi, Gwangyang-si (KR); Yon-Kyun Song, Gwangyang-si (KR); Kwang-Tai Min, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/470,781

(22) PCT Filed: Dec. 21, 2017

(86) PCT No.: PCT/KR2017/015278
§ 371 (c)(1),
(2) Date: Jun. 18, 2019

(87) PCT Pub. No.: WO2018/117703
PCT Pub. Date: Jun. 28, 2018

(65) Prior Publication Data
US 2020/0079056 A1    Mar. 12, 2020

(30) Foreign Application Priority Data

Dec. 21, 2016  (KR) .................. 10-2016-0176123
Dec. 21, 2016  (KR) .................. 10-2016-0176124

(51) Int. Cl.
*B32B 15/01*    (2006.01)
*C22C 21/06*    (2006.01)
(Continued)

(52) U.S. Cl.
CPC ............ *B32B 15/012* (2013.01); *C22C 21/00* (2013.01); *C22C 21/06* (2013.01); *C22C 38/008* (2013.01);
(Continued)

(58) Field of Classification Search
None
See application file for complete search history.

(56) References Cited

U.S. PATENT DOCUMENTS

| | | |
|---|---|---|
| 5,853,806 A | 12/1998 | Higuchi et al. |
| 2009/0053556 A1 | 2/2009 | Sohn et al. |

(Continued)

FOREIGN PATENT DOCUMENTS

| | | |
|---|---|---|
| CN | 1136087 | 11/1996 |
| CN | 1166536 | 12/1997 |

(Continued)

OTHER PUBLICATIONS

European Search Report—European Application No. 17883288.7, dated Nov. 27, 2019, citing JP 2004 244655, Takata, et al. and EP 3 464 662.

(Continued)

*Primary Examiner* — Daniel J. Schleis
(74) *Attorney, Agent, or Firm* — Cantor Colburn LLP

(57) ABSTRACT

Provided are a high manganese hot dip aluminum-plated steel sheet and a method for manufacturing the same, the steel sheet including: a base steel comprising, by wt %, 0.3-0.9% of C, 10-25% of Mn, 0.01-0.5% of Ti, 0.01-0.2% of Sn, 0.01-0.1% of Sb, and the balance of Fe and inevitable impurities; a hot dip aluminum-based steel plated layer formed on the base steel sheet and comprising 0.1 wt % or more of a sum of one or more types among Li, Na, and K, and the balance of Al and inevitable impurities; and an Al—Fe—Si—Mn based alloy layer formed between the (Continued)

base steel sheet and the aluminum-based plated layer, and having a dual structure with different average Fe amounts.

4 Claims, 2 Drawing Sheets

(51) Int. Cl.
    *C22C 38/00*     (2006.01)
    *C22C 38/04*     (2006.01)
    *C22C 38/14*     (2006.01)
    *C23C 2/12*     (2006.01)
    *C23C 2/20*     (2006.01)
    *C23C 2/28*     (2006.01)
    *C23C 2/40*     (2006.01)
    *C22C 21/00*     (2006.01)
(52) U.S. Cl.
    CPC .............. *C22C 38/04* (2013.01); *C22C 38/14* (2013.01); *C23C 2/12* (2013.01); *C23C 2/20* (2013.01); *C23C 2/28* (2013.01); *C23C 2/40* (2013.01); *Y10T 428/12757* (2015.01); *Y10T 428/12764* (2015.01)

(56) References Cited

U.S. PATENT DOCUMENTS

| | | | |
|---|---|---|---|
| 2013/0295409 A1 | | 11/2013 | Chin et al. |
| 2019/0292617 A1* | | 9/2019 | Iung ........................ C22C 38/12 |

FOREIGN PATENT DOCUMENTS

| | | |
|---|---|---|
| CN | 1227272 | 9/1999 |
| CN | 1531604 | 9/2004 |
| CN | 106466697 | 3/2017 |
| EP | 3464662 | 4/2019 |
| JP | H05287489 | 11/1993 |
| JP | 2001192799 | 7/2001 |
| JP | 2004244655  * | 9/2004 |
| JP | 2005272967 | 10/2005 |
| JP | 2009521596 | 6/2009 |
| KR | 20090020751 | 2/2009 |
| KR | 20120065464 | 6/2012 |
| KR | 20140129529 | 11/2014 |
| KR | 20150049991 | 5/2015 |
| KR | 20150077694 | 7/2015 |
| KR | 20160077558 | 7/2016 |
| KR | 20160077594 | 7/2016 |
| WO | 2002103073 | 12/2002 |

OTHER PUBLICATIONS

Takata, et al., Microstructure control of dual-phase steels through hot-dip Al-Mg-Si alloy coating process, ISIJ International, vol. 56, No. 2, Feb. 2016, pp. 319-325.

International Search Report—PCT/KR2017/015278 dated Mar. 30, 2018.

Yun, et al., The Influence of Mischmetal on Wetting of Steel by Zn+5wt%Al Alloys, Journal of Rare Earths, vol. 11, 1993, pp. 130-135.

Chinese Office Action—Chinese Application No. 201780077845.2 dated Sep. 29, 2020, citing CN 106466697, CN 1531604, JP H05-287489, CN 1136087, CN 1166536, and CN 1227272.

Japanese Office Action—Japanese Application No. 2019-533173 dated Sep. 1, 2020, citing JP 2005-272967.

* cited by examiner

HIGH MANGANESE HOT DIP ALUMINUM-PLATED STEEL SHEET HAVING EXCELLENT SACRIFICIAL CORROSION RESISTANCE AND PLATABILITY AND MANUFACTURING METHOD THEREFOR

TECHNICAL FIELD

The present disclosure relates to a high manganese hot dip aluminum-plated steel sheet having an excellent sacrificial corrosion resistance and platability and a manufacturing method therefor.

BACKGROUND ART

In recent years, there has been an increasing demand for high strength and lightening of the weight of steel sheets for automobiles as a part of efforts to strengthen safety regulations of automobiles and to reduce greenhouse gas emissions. To this end, studies of high-strength steel such as dual phase (DP) steel, transformation induced plasticity (TRIP) steel, twinning induced plasticity (TWIP) steel, and the like, containing large amounts of non-platability elements such as Si, Mn, or Al, are actively underway.

Meanwhile, the steel sheets for automobiles are exposed to corrosive environments in the course of use, and therefore, they are required to have excellent corrosion resistance, such that a plated layer is generally formed on the surface thereof to be used in the form of a plated steel sheet.

A current mainstream is a hot dip galvanized steel sheet. This is because the hot dip galvanized steel sheet is not only easy to mass-produce, but also has excellent corrosion resistance and sacrificial corrosion resistance. However, in the case of a hot dip galvanized steel sheet having high strength steel as a base, there is a disadvantage that spot weldability is deteriorated. A plated layer of a weld heat affected zone (HAZ) during spot welding is dissolved by welding heat input and remains as liquid molten zinc. In this case, a grain boundary expansion occurs due to high thermal expansion characteristics strength steel at the surface of a base steel sheet adjacent thereto, and the liquid molten zinc may penetrate into the expanded grain boundary, resulting in brittle fracturing, liquid metal embrittlement (LME), and the like.

Therefore, studies have been made to improve platability, corrosion resistance, spot weldability, and the like, by using aluminum (Al) as a plated layer forming material. However, in the case of a hot dip aluminum-plated steel sheet having high strength steel as a base, not only a large amount of Si, Mn, and Al contained in steel form a single or composite oxide in an annealing process to deteriorate platability, but also the aluminum plated layer does not act as a sacrificial anode. Thus, there may be a disadvantage in that corrosion of the base steel sheet in a cutting surface or a region adjacent to a scratch may not be prevented when the plated steel sheet is cut or scratches are formed on the surface of the plated steel sheet.

Accordingly, attempts have been made to improve platabliity and sacrificial corrosion resistance of a hot dip aluminum-plated steel sheet having high strength steel as a base by adding a trace amount of components in a hot dip aluminum plating bath (see Patent Document 1 and Non-Patent Document 1). However, most of these trace amounts of components have a problem that a melting point thereof is significantly higher than a melting point of aluminum, or have a high risk of being treated as a form of single component metal at room temperature, which makes it difficult to contain the trace amounts of components in the plating bath. In addition, there was a limit in controlling the content thereof even if these trace amounts of components are contained.

PRIOR ART DOCUMENT

Patent Document (Patent Document 1) Japanese Patent Laid-Open Publication No. 2004-244655

Non-Patent Document (Non-Patent Document 1) "Influence of Mischmetal on Wetting of Steel by Zn+5 wt % Al Alloys", Y. Yun et al., Journal of Rare Earths, Vol 11, pp. 130 (1993)

DISCLOSURE

Technical Problem

An aspect of the present disclosure is to provide a high manganese hot dip aluminum-plated steel sheet having excellent sacrificial corrosion resistance and platability and a method for manufacturing the same.

Technical Solution

According to an aspect of the present disclosure, there is provided a high manganese hot dip aluminum-plated steel sheet, the steel sheet includes, a base steel sheet including, by wt %, 0.5% or more of one or more selected from a group consisting of Si, Mn, and Al, a hot dip aluminum-based plated layer formed on the base steel sheet and including 0.1 wt % or more of a sum of one or more of Li, Ca, K, Na, and Mg, and a balance of Al and inevitable impurities, and an Al—Fe—Si—Mn-based alloy layer formed between the base steel sheet and the aluminum-based plated layer, and having a dual structure with different average Fe amounts.

According to another aspect of the present disclosure, there is provided a manufacturing method of a high manganese hot dip aluminum-plated steel sheet, the manufacturing method including, preparing an aluminum plating bath including 0.1 wt % or more of a sum of one or more of Li, Ca, K, Na and Mg, and a balance of Al and inevitable impurities, and immersing and plating the base steel sheet including, by wt %, 0.5% or more of one or more selected from a group consisting of Si, Mn, and Al in the aluminum plating bath, wherein a temperature ($T_P$, °C.) of the aluminum plating bath and a surface temperature ($T_P$, °C.) of the base steel sheet immersed in the aluminum plating bath satisfy the following Relational Expression 1, $$0 \leq (T_P - T_S)/(X_{Al} + X_M) \leq 1.25 \quad \text{[Relational Expression 1]}$$

(where, $X_{Al}$ represents a content of Al (weight %) in the aluminum plating bath and $X_M$ represents a sum (weight %) of the content of one or more of Li, Ca, K, Na and Mg in the aluminum plating bath).

Advantageous Effects

According to the present disclosure, the high manganese hot dip aluminum-plated steel sheet according to the present disclosure has an advantage of excellent sacrificial corrosion resistance and platability.

The various and advantageous advantages and effects of the present invention are not limited to the above description, and can be more easily understood in the course of describing a specific embodiment of the present invention.

BEST MODE FOR INVENTION

Figure 1:
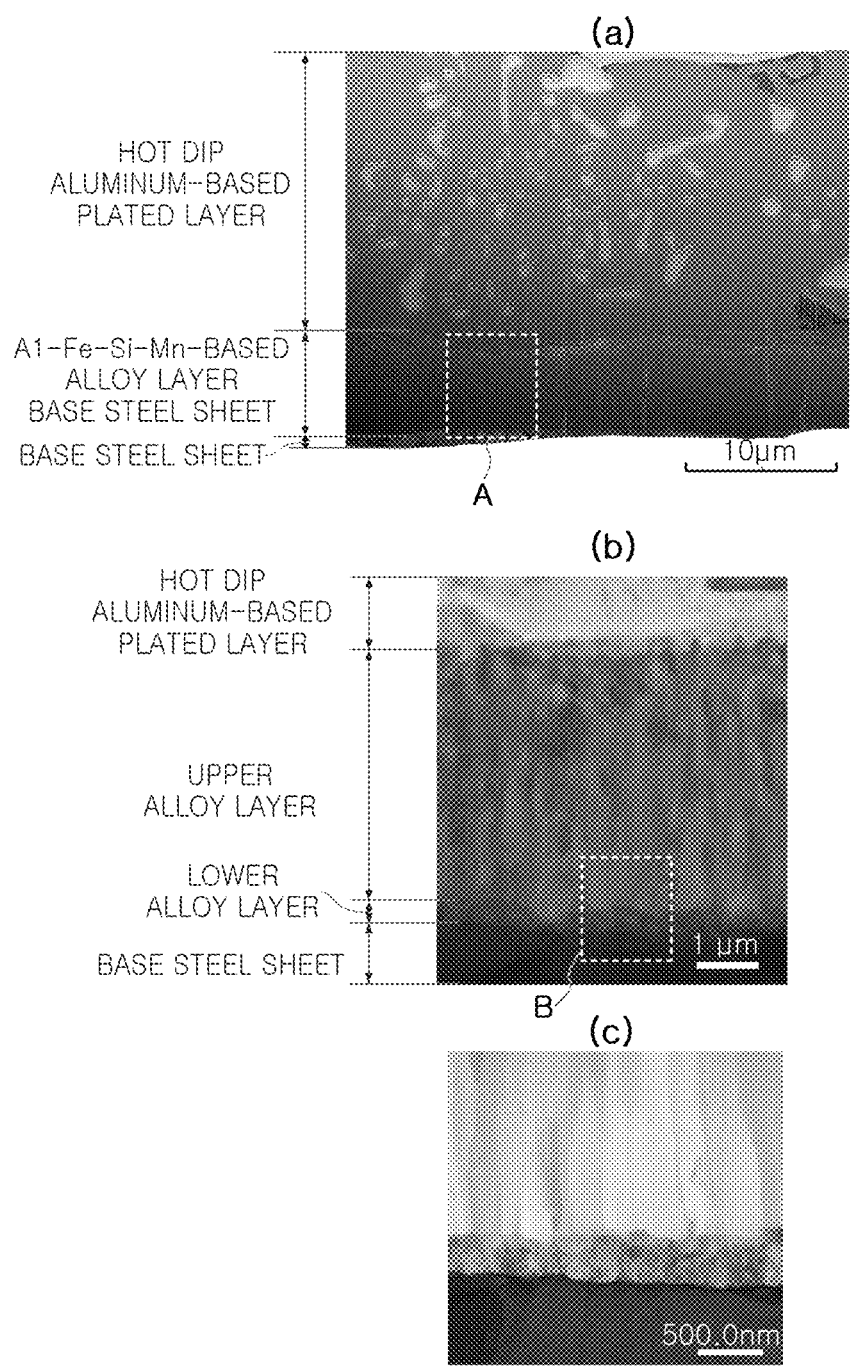
FIG. 1 is (a) an image in which a high manganese hot dip aluminum-plated steel sheet of Inventive Example 1 is cut, and a cross-section thereof is observed by a transmission electron microscope (TEM), (b) an image observed by enlarging region A of (a), and (c) an image observed by enlarging region B of (b).

Hereinafter, a high manganese hot dip aluminum-plated steel sheet having excellent sacrificial corrosion resistance and platability, an aspect of the present disclosure, will be described in detail.

The high manganese hot dip aluminum-plated steel sheet includes a base steel sheet, a hot dip aluminum-based plated layer, and an Al—Fe—Si—Mn-based alloy layer formed between the base steel sheet and the aluminum-based plated layer, having a dual structure.

As disclosed in the present disclosure, it is effective to be applied when the base steel sheet includes 0.5 wt % or more of a sum of one or more selected from a group consisting of Si, Mn, and Al, more preferably 3.5 wt % or more. However, the disclosure of the present disclosure may be applied even when the content is lower than the above-described content, and steels containing a large amount of the above-described elements may have a problem of an unplating or plating removal phenomenon. Thus, only a lower limit thereof is limited. Further, an upper limit thereof is not particularly limited, and all of steels which are liable to cause the unplating or plating removal phenomenon due to the Si, Mn, Al, and the like, may be included. However, according to one embodiment of the present disclosure, the value of Si, Mn, and Al may be set by 30 wt % as a non-limiting example thereof. In addition, if the content of Si, Mn and Al satisfies the above-described conditions, the content of remaining elements of the base steel sheet is not particularly limited, but one example is as follows.

An alloy composition and a desirable content range of the base steel sheet according to one embodiment of the present disclosure will be described as follows. It is to be noted that the content of each component described below is based on weight unless otherwise specified.

C: 0.3 to 0.9%

Carbon (C) is an element contributing to stabilization of an austenite structure, and as a content of C increases, there is an advantage in securing the austenite structure. In addition, carbon serves to increase a stacking fault energy of steel, thereby increasing tensile strength and elongation at the same time. If the content of C is less than 0.3%, there may be a problem that an α'-martensite structure is formed due to decarburization at the time of high-temperature processing of the steel sheet, and becomes vulnerable to delayed fracture, and also it is difficult to secured desired tensile strength and elongation. On the other hand, if the content of C exceeds 0.9%, electrical resistivity increases and weldability may be deteriorated. Therefore, in the present disclosure, the content of C is preferably limited to 0.3 to 0.9%.

Mn: 10 to 25%

Manganese (Mn) is an element stabilizing an austenite structure together with carbon. If the content of Mn is less than 10%, an α'-martensite structure is formed during deformation and it may be difficult to secure a stable austenite structure. On the other hand, if the content of Mn exceeds 25%, there is a disadvantage that an effect of strength improvement is saturated and manufacturing costs are increased. Therefore, in the present disclosure, the content of Mn is preferably limited to 10 to 25%.

Ti: 0.01 to 0.5%

Titanium (Ti) reacts with nitrogen in steel to form a nitride, thereby improving formability of the steel, and reacts to with carbon in steel to form a carbide, thereby improving strength of the steel. In order to obtain such an effect in the present disclosure, in the present disclosure, the content of Ti is preferably 0.01 or more. However, if the content of Ti exceeds 0.5%, precipitates are excessively formed, thereby deteriorating fatigue characteristics of the steel. Therefore, in the present invention, it is preferable to limit the content of Ti to 0.01 to 0.5%.

Sn: 0.01 to 0.2%

Generally, when silicon (Si) and manganese (Mn) are contained in a large amount in steel, as in the present disclosure, silicon and manganese having high oxygen affinity at the time of annealing forms a single or complex oxide on a surface layer of the steel sheet, thereby deteriorating platability. Tin (Sn) mainly serves to improve platability by effective suppressing surface enrichment of manganese of steel to suppress formation of manganese-based oxides. In order to obtain such effects in the present disclosure, the content of Sn is preferably 0.01% or more. However, if the content of Sn exceeds 0.2%, the effect is saturated and it is also difficult to secure economic feasibility in terms of cost competitiveness. Therefore, in the present disclosure, the content of Sn is preferably limited to 0.01 to 0.2%.

Sb: 0.01 to 0.1%

Antimony (Sb) is an element which is enriched directly under the surface layer of the steel sheet during annealing heat treatment. Antimony may prevent diffusion of Si, Mn, and Al alloy elements to the surface along grain boundaries, thereby securing the platablity of molten aluminum. In order to obtain such effects in the present disclosure, it is preferable that the content of tin is 0.01% or more. However, when the content thereof exceeds 0.1%, scale remains in a surface layer portion during cold rolling pickling such that a pickling property is deteriorated. Therefore, the content thereof is preferably limited to 0.01 to 0.1% or less.

A remainder of the above-mentioned composition is iron (Fe). However, since inevitable impurities which are not intended from raw materials or surrounding environments is able to inevitably incorporated, in a manufacturing process in the related art, they may not be excluded. These impurities are not specifically mentioned in the present specification, as they are known to anyone in the skilled art.

A hot dip aluminum-based plated layer is formed on the base steel sheet and contributes to improving in corrosion resistance. The hot dip aluminum-based plated layer includes 0.1 wt % or more of a sum of one or more of Li, Ca, K, Na, and Mg, and the balance consists of Al and inevitable impurities.

As described above, since an aluminum-plated layer made only of pure Al does not act as a sacrificial anode, when a plated steel sheet is cut or scratches are formed on the surface of the plated layer, there was a disadvantage that corrosion of the steel sheet may not be prevented on the cut surface or in the regions adjacent to the scratches. However, when a metal having a high ionization tendency such as Li, Ca, K, Na, and Mg is contained in the aluminum-based plated layer, the sacrificial corrosion resistance of the plated layer is greatly improved and corrosion of the base steel sheet may be effectively prevented even when the plated steel sheet is cut or scratches, or the like occurs on the surface of the plated layer. When an appropriate amount of Li, Ca, K, Na and Mg is added in the aluminum-based plating bath in the course of manufacturing of the plated steel sheet, a Si, Mn and Al single and/or composite oxide formed on the surface layer of the base steel sheet undergoes a substitution reaction with these elements to reduce a portion of the oxide and remove a diffusion barrier. As a result, diffusion of Fe in the steel is accelerated, and a dual structure interfacial layer is formed between the base steel sheet and the aluminum-based plated layer, whereby the platability of the aluminum-based plated steel sheet is remarkably improved. In order to obtain such effects in the present disclosure, 0.1 wt % or more of a sum of one or more Li, Ca, K, Na, and Mg is preferably included, more preferably 1.0 wt % or more is more preferably included, and 2.0 wt % or more is most preferably included. Meanwhile, the higher the content of one or more of Li, Ca, K, Na, and Mg, the more advantageous in terms of sacrificial corrosion resistance and platability, such that an upper limit of the sum of these contents is not particularly limited, but these elements are elements having very high oxidation, and the sum thereof may be limited to 5 wt % in consideration of an amount of Fe eluted during Fe elution using a Fe-based alloy ingot. According to one embodiment of the present disclosure, it is more advantageous to include one or more selected from a group consisting of Li, Na and K of the above elements, and it is most advantageous to include at least one or more selected from Li and K.

Meanwhile, in addition to the above components, addition of an effective component in the aluminum-based plated layer is not excluded, and may further include, for example, Si. In this case, it is preferable to control a content of Si to 0.1 wt % or more and 13 wt % or less. If the content of Si is 0.1 wt % or less, it may be difficult to suppress the Fe elution by Si and remove plating removal due to embrittlement of an alloy layer. On the other hand, if the content of Si exceeds 13 wt %, formation of a second phase and dross defects may be caused in excess of a solubility limit.

The Al—Fe—Si—Mn-based alloy layer is formed between the base steel sheet and the aluminum-based plated layer and contributes to improving in platability. In the present disclosure, the Al—Fe—Si—Mn-based alloy layer has a dual structure of a lower alloy layer formed on a base steel sheet and an upper alloy layer formed on the lower alloy layer and having an average content of Fe, lower than that of the lower alloy layer.

According to an example, the average content of Fe of the lower alloy layer may be 50 wt % or more, and the average content of Fe of the upper alloy layer may be less than 50 wt %. When the average content of Fe of the lower alloy layer is less than 50 wt %, a possibility of partially desorbing the oxide existing on the interface of the plating layer and the base steel sheet in the course of the Fe diffusion becomes low, which may be disadvantageous from a viewpoint of plating adhesion. On the other hand, when the average content of Fe of the upper alloy layer is 50 wt % or more, excessive Fe diffusion may cause powdering defects of the plated layer.

According to an example, the average content of Si of the lower alloy layer may be less than 5 wt %, and the average content of Si of the upper alloy layer may be 5 wt % or more. When the average content of Si of the lower alloy layer is 5 wt % or more, diffusion of Fe due to Si in the plating bath may be suppressed and the possibility of partially desorbing the oxide existing on the interface between the plated layer and the base steel sheet during the Fe diffusion process is lowered, which may be disadvantageous from the viewpoint of plating adhesion. Meanwhile, when the average content of Si of the upper alloy layer is less than 5 wt %, excessive diffusion of Fe may not be suppressed, which may cause powdering defects during processing after plating.

Meanwhile, in the present disclosure, a method for measuring the average content of Fe and Si included in the Al—Fe—Si—Mn-based alloy layer is not particularly limited, and for example, the following method may be used. That is, after cutting the plated steel sheet vertically, a cross-sectional image was captured at a magnification of 100,000 with a transmission electron microscope (TEM), the contents of Fe and Si were spot analyzed using energy dispersive spectroscopy (EDS) at equal intervals to 30 spots at the interface of the plated layer and the base steel sheet, and then an average value thereof may be defined as the average content of Fe and Si included in the Fe—Zn—Mn—Al-based alloy layer.

According to an example, an average thickness of the lower alloy layer may be 0.2 to 0.8 μm. When the average thickness of the lower alloy layer is less than 0.2 μm, it can be seen that diffusion of Fe in steel does not occur smoothly due to a barrier such as an oxide, or the like, on the surface of the steel sheet. As a result, an anchoring effect due to the lower alloy layer is excluded and it is difficult to expect excellent plating adhesion. Meanwhile, when the average thickness of the lower alloy layer exceeds 0.8 μm, the alloy layer becomes thick and brittle due to excessive Fe diffusion, which may cause powdering defects during processing and after plating.

According to an example, the average thickness of the upper alloy layer may be 1.5 to 8 μm. When the average thickness of the upper alloy layer is less than 1.5 μm, diffusion of Fe in steel may not be appropriately performed due to impurities or oxides on the surface of the steel sheet, and diffusion of Fe may be locally concentrated, resulting in uneven plating appearance. Meanwhile, when the average thickness of the upper alloy layer exceeds 8 μm, the alloy layer becomes thick and brittle due to excessive Fe diffusion, which may cause powdering defects during processing and after plating.

Meanwhile, in the present disclosure, a method of measuring the average thickness of the Al—Fe—Si—Mn-based alloy layer is not particularly limited. But, for example, the following method may be used. That is, after cutting the plated steel sheet vertically, the cross-sectional image was taken at a magnification of 100,000 with a transmission electron microscope (TEM), and the upper and lower alloy layers were separated through the contrast difference, and the thicknesses of respective alloy layers are measured at five points. In addition, the average value of ten specimens may be defined as the average thickness of the Al—Fe—Si—Mn-based upper or lower alloy layer.

According to an example, oxides including one or two or more of Si, Mn and Al may be discontinuously distributed at the interface of the base steel sheet and the Al—Fe—Si—Mn-based alloy layer. In this case, a linear fraction, which is a value obtained by dividing a length of the oxide projected on the interface between the base steel sheet and the Al—Fe—Si—Mn-based alloy layer in a direction of a cross-section of the thickness of the steel sheet by the length of the interface between the base steel sheet and the Al—Fe—Si—Mn-based alloy layer, may be 0.35 to 0.45. If the linear fraction of the interfacial oxide is less than 0.35, it is immersed in the plating bath and the diffusion of the steel sheet Fe occurs due to immersion in the plating bath to cause the diffusion of the steel sheet Fe. A Fe diffusion rate may not be appropriately controlled by the oxide and excessive Fe diffusion may occur, and powdering defects may be caused during processing. If the line fraction of the interfacial oxide exceeds 0.45, platability is deteriorated by the interfacial oxide to occur spot unplating, and in addition, it may be difficult to obtain a uniform plating appearance due to an outburst phenomenon which occurs as a diffusion barrier of the steel sheet Fe and excessive localized Fe diffusion.

Hereinafter, a method for manufacturing a high manganese hot dip aluminum-plated steel sheet having excellent sacrificial corrosion resistance and platability according to another aspect of the present disclosure will be described in detail.

Preparing Aluminum Plating Bath

An aluminum plating bath including 0.1 wt % or more of a sum of one or more of Li, Ca, K, Na and Mg, selectively 0.1 to 13 wt % of Si, and a balance of Al and inevitable impurities, is prepared. In the present disclosure, a specific method for preparing such an aluminum plating bath is not particularly limited, but the following method may be used as an example without limitation.

First, an aluminum ingot is melted to form aluminum molten metal, and then an Fe-based alloy ingot including one element selected from a group consisting of Li, Ca, K, Na and Mg is introduced to the aluminum molten metal.

Alkali metals such as Li, Ca, K, Na and Mg have a melting point significantly higher than a melting point of Al, and have a high risk of being handled as a single component metal form at room temperature, such that it is difficult to contain trace components in the plating bath. Even if the trace components are included, there is a limit in controlling the content thereof.

Accordingly, in the present disclosure, the content of trace components in the hot dip aluminum plating bath is controlled using an elution phenomenon. To this end, the Fe-based alloy ingot including one element selected from a group consisting of Li, Ca, K, Na and Mg is introduced to aluminum molten metal, thereby controlling the content of trace elements.

In this case, elution of these elements occurs when elution of iron (Fe) preferentially occurs, and an amount of elution of these trace elements depends on the contents of trace elements included in the Fe-based alloy ingot. Therefore, it is possible to control the amount of iron (Fe) eluted from the Fe-based alloy ingot by controlling time for immersing the Fe-based alloy ingot in the plating bath, and if an elution amount of iron (Fe) is determined, the elution amount of the trace element is also determined according to the content of the trace element included in the Fe-based alloy ingot.

Meanwhile, it is preferable to control the sum of the contents of these elements in the aluminum molten metal to be 0.1 wt % or more. As described above, these elements contribute to improving platability and sacrificial corrosion resistance of the high manganese aluminum-based plated steel sheet. If the sum of the contents thereof is less than 0.1 wt %, it is difficult to sufficiently secure the effect. Meanwhile, in the present disclosure, an upper limit of the sum of the content of the trace elements is not particularly limited, but may be limited to 5 wt % in consideration of the limit of the content of trace components eluted in the Fe elution using the Fe-based alloy ingot.

According to one example a temperature of the aluminum molten metal may be 560° C. to 680° C. If the temperature of the aluminum molten metal is less than 560° C., an aluminum-based plating bath begins to solidify, and viscosity of the plating bath increases. As a result, a degree of mobility of rolls rolling a steel sheet is reduced, thereby causing a slip between the steel sheet and the roll, thereby causing defects in the steel sheet. On the other hand, if the temperature thereof exceeds 680° C., dissolution of the steel sheet is promoted to accelerate occurrence of iron (Fe)-aluminum (Al) compound dross, thereby causing unplating. Meanwhile, it is preferable that the temperature of the aluminum molten metal is maintained not only when the hot dip aluminum plating bath is prepared, but also when the base steel sheet is immersed and the plating proceeds.

Next, if necessary, the Si ingot or the Fe—Si-based alloy ingot may be introduced to the aluminum molten metal after the above-described trace element is controlled. As described above, when the Si ingot or the Fe—Si-based alloy ingot is introduced into the aluminum molten metal, the aluminum plating bath includes Si, and in this case, the platability of the hot dip aluminum-based plated steel sheet is improved.

In this case, it is preferable that the content of Si in the aluminum molten metal is controlled to be 0.1 wt % or more 13 wt % or less. If the content of Si is 0.1 wt % or less, it may be difficult to suppress the Fe elution by Si and to remove plating removal due to embrittlement of the alloy layer. On the other hand, if the content thereof exceeds 13 wt %, it may exceed a solubility limit and cause formation of a secondary phase and dross defects.

Next, if necessary, if the content of Fe in the aluminum molten metal exceeds 3 wt %, after controlling the content of Si, a operation of controlling the content of Fe to be 3 wt % or less by melting the aluminum ingot in the aluminum molten metal, may be further included. If the content of Fe of the molten metal exceeds 3 wt %, it may react with aluminum (Al) to cause Fe—Al-based dross occurrence and surface defects.

Plating

A base steel sheet having the above-described component system is immersed in an aluminum plating bath and plated. In this case, a temperature ($T_P$, °C.) of the aluminum plating bath and a surface temperature ($T_S$, °C.) of the base steel sheet immersed in the aluminum plating bath are preferably controlled to satisfy the following Relational Expression 1, $$0 \leq (T_P - T_S)/(X_{Al} + X_M) \leq 1.25 \qquad \text{[Relational Expression 1]}$$

(where, $X_{Al}$ is a content of Al (weight %) in the aluminum plating bath, and $X_M$ is a sum (weight %) of the content one or more of Li, Ca, K, Na and Mg in the aluminum plating bath).

If $(T_P-T_S)/(X_{Al}+X_M)$ is less than 0, a rate at which the molten aluminum solidifies on the surface of the base steel sheet rapidly increases, and fluidity at the surface of the base steel sheet decreases. Thus, as the fluidity on the surface of the base steel sheet is reduced, variation of an amount of plating adhesion to each part is accelerated and there is a possibility of causing unplating defects. On the other hand, when $(T_P-T_S)/(X_{Al}+X_M)$ exceeds 1.25, dissolution of the base steel sheet is promoted to accelerate the occurrence of iron (Fe)-aluminum (Al) compound dross, thereby causing unplating. According to one embodiment of the present disclosure, upper and lower limits of the above Relational Expression 1 may be limited to 0.1 and 1.0, respectively.

According to an example, after the plating, a operation of performing alloy heat treatment the base steel sheet immersed in the aluminum plating bath at a temperature of 720° C. or higher may be selectively further included. When the alloy heat treatment is performed at a temperature of 720° C. or higher, the content of iron (Fe) in the plated layer may be sufficiently secured. However, when the alloy heat treatment temperature is excessively high, the content of iron (Fe) is excessive, a powdering phenomenon in which the plated layer is dropped during processing may occur. Thus, an upper limit thereof is preferably controlled to 1000° C. or lower.

MODE FOR INVENTION

Hereinafter, the present disclosure will be described more specifically with reference to detailed exemplary embodiments. The following exemplary embodiments are merely examples for easier understanding of the present disclosure, and the scope of the present disclosure is not limited thereto.

EMBODIMENT

Embodiment 1

A TWIP steel sheet having a sum of a content of Si, Mn, and Al of 18.4 wt % was cold rolled and a surface of the steel sheet was cleaned through a degreasing and pickling process. Then nitrogen gas including 5% by volume of hydrogen was blown in a reducing furnace and performed an annealing process at 760° C. for 90 seconds. Next, the cold-rolled steel sheet subjected to the annealing process was cooled, immersed in a hot dip plating bath for 5 seconds and then air wiping was used to adjusted an amount of plating adhesion to a level of 80 g/m². Meanwhile, in each example, a plating bath component, a steel sheet entering temperature, and a plating bath temperature were controlled to be different from each other and were shown in Table 1 below.

A specific method for manufacturing the plating bath in Inventive Examples 1 to 6 and Comparative Example 1 are as follows. First, a pure aluminum ingot was melted in a plating bath to form aluminum molten metal, and then an Fe-based alloy ingot (containing 60 wt % of Fe) including one element selected from a group consisting of Li, K, Ca, Na and Mg shown in the following Table 1 was introduced. Thereafter, an Fe—Si-based ingot alloy ingot (containing 10 wt % of Fe) was introduced to the aluminum molten metal to control the content of Si in the molten metal to about 5 wt % (except for Comparative Examples 4 and 5). Trace elements and the content of Si in the molten metal were controlled by controlling the immersion time of the alloy ingot. In the table, elements not shown in Inventive Example and Comparative Example 1 are 5% of Si and the balance of Fe. In Comparative Examples 2 and 3, 7% of Si and 2% of Fe were further included. In Comparative Examples 4 and 5, the remaining components not shown in the table are impurities.

TABLE 1

| Division | Plating bath component (weight %) | | | | Entering temperature of steel sheet(° C.) | Temperature of plating bath(° C.) | $(T_P - T_S)/(X_{Al} + X_M)$ |
| --- | --- | --- | --- | --- | --- | --- | --- |
| | Zn | Al | Trace elements | | | | |
| | | | Types | Content | | | |
| Inventive Example 1 | 0 | 88.7 | Mg | 3.8 | 650 | 660 | 0.11 |
| Inventive Example 2 | 0 | 88.7 | Li | 3.8 | 650 | 660 | 0.11 |
| Inventive Example 3 | 0 | 88.7 | Ca | 3.8 | 650 | 660 | 0.11 |
| Inventive Example 4 | 0 | 88.7 | K | 3.8 | 650 | 660 | 0.11 |
| Inventive Example 5 | 0 | 88.7 | Na | 3.8 | 650 | 660 | 0.11 |
| Inventive Example 6 | 0 | 88.9 | Mg | 3.8 | 600 | 660 | 0.65 |
| Comparative Example 1 | 0 | 94.9 | Mg | 0.08 | 650 | 660 | 0.11 |
| Comparative Example 2 | 0 | 91 | — | 0 | 500 | 660 | 1.76 |
| Comparative Example 3 | 0 | 91 | — | 0 | 680 | 660 | −0.22 |
| Comparative Example 4 | 99.65 | 0.21 | — | 0 | 480 | 460 | — |
| Comparative Example 5 | 99.68 | 0.13 | — | 0 | 480 | 460 | — |

Thereafter, a coating area ratio of the plated layer to an entire area of the surface of the steel sheet was measured to evaluate platability of the manufactured hot dip plated steel sheet, which was shown in Table 2 below.

In addition, in order to evaluate spot weldability of the manufactured hot dip plated steel sheet, a welding current was supplied using a Cu—Cr electrode having a tip radius of 6 mm, and welding was performed at a pressing force of 2.6 kN under conditions of an energizing time of 16 cycles and a holding time of 15 cycles. Assuming that the thickness of the steel sheet is t, the welding current at the time at which a nugget diameter becomes smaller than $4\sqrt{t}$ is set as a lower limit, and the welding current at the time at which a blowing phenomenon occurs is set as an upper limit (expulsion current). In order to observe the LME crack at a current value, lower than 0.2 kA from the upper limit, the specimen was cut into 15×15 mm² and the cross-section was polished. Then, a maximum length (unit: μm) of the LME crack was measured with an optical microscope, which was also shown in Table 2 below.

In addition, Table 2 showed that results of measuring potentiodynamic corrosion potential in a 3.5 volume % of aqueous solution by cutting the specimens to 15×15 mm² in order to examine the sacrificial corrosion resistance of the manufactured hot dip aluminum-plated steel sheets.

the content of Mg, a trace element in the plating bath deviates from the a lower limit range of the present disclosure, excellent platability and LME crack resistance were shown, while the content of Mg in the plated layer was low, and the coercive corrosion potential was not much different from the pure aluminum-plated steel sheet, resulting in no improvement of the sacrificial corrosion resistance.

In addition, in Comparative Example 2, in which the entering temperature of the steel sheet deviates from the lower limit range of the present disclosure, as a rate of solidification of the molten aluminum on the surface of the steel sheet rapidly increases, and fluidity on the surface of the steel sheet decreases, thereby accelerating variations of an amount of plating adhesion to each part and causing unplating defects. As a result, the coating area ratio of the aluminum-plated layer was only 83.5%, such that platabliity was deteriorated.

Furthermore, in Comparative Example 3, in which the entering temperature of the steel sheet deviates from the upper limit range of the present disclosure, elution of iron (Fe) is accelerated in the plating bath to dissolve the steel sheet immersed in the plating bath to form a large amount of iron (Fe)-aluminum (Al) compound upper dross, thereby causing plating defects during the steel sheet withdrawal process, and the coating area ratio of the aluminum-plated layer was only 74%.

TABLE 2

| Division | Plated layer Kinds of trace elements | Content (weight %) | Coating area ratio of plated layer (%) | Maximum length LME cracks of @Expulsion current-0.2 (kA) | Applied Potential (V vs SCE) |
|---|---|---|---|---|---|
| Inventive Example 1 | Mg | 9.6 | 95.2 | 0 | −1.18 |
| Inventive Example 2 | Li | 9.6 | 95.4 | 0 | −1.93 |
| Inventive Example 3 | Ca | 9.6 | 96.2 | 0 | −1.65 |
| Inventive Example 4 | K | 9.6 | 96.0 | 0 | −1.80 |
| Inventive Example 5 | Na | 9.6 | 95.8 | 0 | −1.51 |
| Inventive Example 6 | Mg | 9.4 | 99.1 | 0 | −1.17 |
| Comparative Example 1 | Mg | 0.19 | 99.1 | 0 | −0.81 |
| Comparative Example 2 | — | 0 | 83.5 | 0 | −0.72 |
| Comparative Example 3 | — | 0 | 74.0 | 0 | −0.71 |
| Comparative Example 4 | — | 0 | 99.0 | 290 | −1.09 |
| Comparative Example 5 | — | 0 | 99.5 | 206 | −1.11 |

As shown in Table 2, in Inventive Examples 1 to 6, in which concentration of trace elements in a hot dip plating bath and an entering temperature of the steel sheet all satisfy the range of the present disclosure, it can be seen that a coating area ratio of the plated layer was all 95% or more, and platablility was extremely excellent. In addition, as a result of measuring a length of LME cracks in a vicinity of the expulsion current, it can be confirmed that spot welding LME crack resistance is very excellent since LME cracks does not occur. It can be seen that the potentiodynamic polarization corrosion potential, measured to confirm sacrificial corrosion resistance, has a remarkable decrease in corrosion potential, compared to the pure aluminum plated-steel sheet, that is, has the excellent sacrificial corrosion resistance. However, in Comparative Example 1, in which In addition, in Comparative Examples 4 to 5, in which a basic composition of the plated layer was zinc rather aluminum as a basic composition, excellent platability and sacrificial corrosion resistance were shown, while LME cracks at a level of several hundred micrometers were generated in a vicinity of the upper limit current, such that spot welding LME crack resistance was deteriorated.

Embodiment 2

A TWIP steel sheet including 0.66 wt % of C, 17.5 wt % of Mn, 0.06 wt % of Ti, 0.02 wt % of Sn, and 0.01 wt % of Sb was cold rolled and the surface of the steel sheet was cleaned through degreasing and pickling processes and then nitrogen gas including 5 volume % of hydrogen was blown from a reduction furnace, and an annealing process was performed at a temperature of 760° C. for 90 seconds. Next, the cold-rolled steel sheet subjected to the annealing process was cooled, immersed in a hot dip plating bath for 5 seconds, and then air wiping was used to adjust an amount of plating adhesion to a level of 80 g/m². Meanwhile, in each example, the plating bath component, the entering temperature of the steel sheet, and the temperature of the plating bath were controlled to be different from each other and were shown in Table 3 below. In the table, elements not shown in Inventive Examples and Comparative Examples 6, 11, 3, and 15 7.5% of Si and the balance of Fe. In addition, in Comparative Examples 7 and 8, 7% of Si and 2% of Fe were further included, and in Comparative Example 9 and 10, the remaining components not shown in the table were impurities.

Specific methods for manufacturing the plating bath in Inventive Example 7 to 10 and Comparative Examples 11, 13, and 14, are as follows. First, a pure aluminum ingot was melted in the plating bath to form an aluminum molten metal, and then an Fe-based alloy ingot (containing 60 wt % of Fe) including one kind of trace element from a group consisting of Li, K and Na, as shown in Table 3 below was introduced. Thereafter, an Al—Si-based alloy ingot was introduced to the aluminum molten metal to control the content of Si in the molten metal to about 7.5 wt %. Trace elements and a content of Si in the molten metal were controlled by controlling an immersion time of the alloy ingot.

Thereafter, the thickness of the Al—Fe—Si—Mn-based alloy layer, the content of Fe and Si, or the like, were measured by TEM and GDOES after cutting the manufactured hot dip plated steel sheet vertically, and the results thereof were shown in Table 2 below. A specific measurement method is as describe above. Meanwhile, examples in which contents of the upper alloy layer are not described in Table 4 below correspond to an example in which an alloy layer of a single structure is formed instead of a dual structure.

Thereafter, in order to evaluate the platability of the manufactured hot dip plated steel sheet, the coating area ratio of the plated layer to the entire area of the surface of the steel sheet was measured and shown in Table 5 below.

In addition, in order to evaluate spot weldability of the manufactured hot dip plated steel sheet, welding current was supplied using a Cu—Cr electrode having a tip radius of 6 mm, and welding was performed at a pressing force of 2.6 kN under conditions of an energizing time of 16 cycles and a holding time of 15 cycles. Assuming that the thickness of the steel sheet is t, the welding current at the time at which a nugget diameter becomes smaller than 4√t is set as a lower limit, and the welding current at the time at which a blowing phenomenon occurs is set as an upper limit (expulsion current). In order to observe the LME crack at a current value, lower than 0.2 kA from the upper limit, the specimen was cut into 15×15 mm² and the cross-section was polished. Then, a maximum length (unit: μm) of the LME crack was measured with an optical microscope, also shown in Table 3 below.

In addition, Table 3 showed that results of measuring potentiodynamic corrosion potential in a 3.5 volume % of aqueous solution by cutting the specimens to 15×15 mm² in order to examine the sacrificial corrosion resistance of the manufactured hot dip aluminum-plated steel sheets.

TABLE 3

| Division | Plating bath component (weight %) | | | | Entering temperature of steel sheet(° C.) | Temperature of plating bath(° C.) |
| --- | --- | --- | --- | --- | --- | --- |
| | Zn | Al | Trace element | | | |
| | | | Types | Content | | |
| Inventive Example7 | 0 | 88.7 | Li | 3.7 | 610 | 630 |
| Inventive Example8 | 0 | 88.7 | Na | 3.8 | 610 | 630 |
| Inventive Example9 | 0 | 88.7 | K | 3.7 | 610 | 630 |
| Inventive Example10 | 0 | 88.7 | Na | 3.8 | 610 | 630 |
| Comparative Example6 | 0 | 88.6 | Mg | 3.9 | 600 | 640 |
| Comparative Example 7 | 0 | 91 | — | 0 | 500 | 660 |
| Comparative Example 8 | 0 | 91 | — | 0 | 680 | 660 |
| Comparative Example 9 | 99.65 | 0.21 | — | 0 | 480 | 460 |
| Comparative Example 10 | 99.68 | 0.13 | — | 0 | 480 | 460 |
| Comparative Example 11 | 0 | 88.7 | Na | 3.8 | 570 | 670 |
| Comparative Example 12 | 0 | 88.9 | — | 0 | 650 | 640 |
| Comparative Example 13 | 0 | 88.7 | Na | 3.8 | 570 | 560 |
| Comparative Example 14 | 0 | 88.7 | Na | 3.8 | 560 | 660 |

TABLE 4

| Division | Plated layer Types of trace elements | Plated layer Content (weight %) | Lower alloy layer Si content (weight %) | Upper alloy layer Si content (weight %) | Lower alloy layer Fe content (weight %) | Upper alloy layer Fe content (weight %) | Linear fraction of interface oxides (%) | Lower alloy layer thickness (μm) | Upper alloy layer thickness (μm) |
|---|---|---|---|---|---|---|---|---|---|
| Inventive Example7 | Li | 3.7 | 2.4 | 6.4 | 59 | 45 | 37 | 0.5 | 7.8 |
| Inventive Example8 | Na | 3.8 | 2.2 | 6.7 | 53 | 46 | 43 | 0.25 | 7.1 |
| Inventive Example9 | K | 3.6 | 2.7 | 6.9 | 60 | 46 | 40 | 0.4 | 7.5 |
| Inventive Example10 | Na | 3.7 | 2.6 | 6.5 | 54 | 48 | 44 | 0.25 | 7.1 |
| Comparative Example6 | Mg | 3.9 | 4.0 | 5.5 | 52 | 49 | 49 | 0.20 | 6.2 |
| Comparative Example 7 | — | 0 | 5.2 | — | 44 | — | 69 | 3.8 | — |
| Comparative Example 8 | — | 0 | 5.4 | — | 46 | — | 76 | 3.3 | — |
| Comparative Example 9 | — | 0 | — | — | 43 | — | 50 | 0.04 | — |
| Comparative Example 10 | — | 0 | — | — | 54 | — | 53 | 0.05 | — |
| Comparative Example 11 | Na | 4.0 | 2.2 | 6.3 | 75 | 55 | 24 | 1.0 | 8.3 |
| Comparative Example 12 | — | 0 | 6.2 | — | 47 | — | 80 | 1.3 | — |
| Comparative Example 13 | Na | 4.0 | 2.1 | 6.5 | 33 | 29 | 86 | 0.05 | 0.8 |
| Comparative Example 14 | Na | 4.0 | 2.0 | 6.4 | 62 | 53 | 20 | 1.5 | 9.5 |

TABLE 5

| Division | Plated layer Kinds of trace elements | Plated layer Content (weight %) | Coating area ratio of plated layer (%) | Whether plating is removed or not | Maximum length of LME cracks@Expulsion current-0.2 (kA) | Applied Potential (V vs SCE) |
|---|---|---|---|---|---|---|
| Inventive Example7 | Li | 3.7 | 95.4 | Non-removal | 0 | −1.93 |
| Inventive Example8 | Na | 3.8 | 96.2 | Non-removal | 0 | −1.55 |
| Inventive Example9 | K | 3.6 | 96.0 | Non-removal | 0 | −1.80 |
| Inventive Example10 | Na | 3.7 | 95.8 | Non-removal | 0 | −1.51 |
| Comparative Example6 | Mg | 3.9 | 99.1 | Non-removal | 0 | −1.17 |
| Comparative Example 7 | — | 0 | 83.5 | Removal | 0 | −0.72 |
| Comparative Example 8 | — | 0 | 74.0 | Removal | 0 | −0.71 |
| Comparative Example 9 | — | 0 | 99.0 | Non-removal | 290 | −1.09 |
| Comparative Example 10 | — | 0 | 99.5 | Non-removal | 206 | −1.11 |
| Comparative Example 11 | Na | 4.0 | 95.2 | Removal | 0 | −1.54 |
| Comparative Example 12 | — | 0 | 95.6 | Non-removal | 0 | −0.73 |
| Comparative Example 13 | Na | 4.0 | 87.2 | Removal | 0 | −1.56 |
| Comparative Example 14 | Na | 4.0 | 96.1 | Removal | 0 | −1.55 |

As shown in Tables 1 to 5, in Inventive Examples 1 to 7, in which concentration of trace elements in the hot dip plating bath, an entering temperature of the steel sheet, and a linear fraction of the alloy layer all satisfy the range of the present disclosure, it can be confirmed that the coating area ratio of the plated layer was all 95% or more, and the platability was extremely excellent. In addition, as a result of measuring the length of LME cracks in the vicinity of the expulsion current, it can be confirmed that the spot welding LME crack resistance is very excellent since LME cracks do not occur. It can be seen that the corrosion potential, measured to confirm sacrificial corrosion resistance, has a remarkable decrease in corrosion potential, compared to the pure aluminum plated-steel sheet, that is, has the excellent sacrificial corrosion resistance.

However, in Comparative Example 6, in which Mg is added as a trace component in the plating bath, excellent platability and LME crack resistance were shown, while an ionization tendency of Mg in the plating layer was low and the potentiodynamic corrosion potential compared to Li, Na, and K of the present disclosure was low, such that an improvement width of the sacrificial corrosion resistance was small.

In addition, in Comparative Example 7, in which the entering temperature of the steel sheet deviates from the lower limit range of the present disclosure, as a rate of solidification of molten aluminum on the surface of the steel sheet increased sharply, and fluidity on the surface of the steel sheet decreases, thereby accelerating variations of an amount of plating adhesion to each part and causing unplating defects. In addition, the oxide breakdown effect due to thermal shock generated due to the difference between the entering temperature of the steel sheet and the temperature of the plating bath was insufficient due to lowering of the fluidity of the plating bath, such that the linear fraction of the interfacial oxide exceeded the range of the present disclosure. As a result, a coating area ratio of the aluminum-plated layer was only 83.5%, such that the pliability was deteriorated.

Further, in the case of Comparative Example 8 in which the entering temperature of the steel sheet is out of an upper limit range of the present disclosure, the dissolution of iron (Fe) is accelerated in the plating bath to dissolve the steel sheet immersed in the plating bath to form a large amount of iron (Fe)-aluminum ((Al) compound upper dross, thereby causing plating defects in the steel sheet withdrawal process. In addition, since the entering temperature of the steel sheet was higher than the temperature of the plating bath, and the oxide breakdown effect due to thermal shock did not occur, such that the linear fraction of the interface oxides exceeded the range of the present disclosure, which resulting in only 74% of the coating area ratio of the aluminum-plating layer.

In addition, in Comparative Examples 9 to 10, in which a basic composition of the plated layer was zinc, rather than aluminum as a basic composition, due to an alloy suppression layer ($Fe_2Al_5$) formed by the reaction between a trace amount of aluminum in the zinc plating bath and the steel sheet Fe, it is strictly distinguished from the alloy layer. In Table 5, the content of Fe and the thickness were measured by considering the alloy suppression layer as a lower alloy layer. However, since a trace amount of aluminum reacts with Fe to form an intermetallic compound, and then diffusion of the steel sheet Fe was remarkably suppressed, such that the thickness of the lower alloy layer does not fail in the range of the present disclosure. Excellent platability and sacrificial corrosion resistance were observed, while LME cracks at a level of several hundred micrometers in a vicinity of the upper current occurred and spot welding LME crack resistance was deteriorated.

In the case of Comparative Example 11 in which the content of Fe in the lower alloy layer exceeds the condition of the present disclosure, the entering temperature of the steel sheet slightly deviates from the lower limit of the present disclosure in the correlation between the entering temperature of the steel sheet and the temperature of the plating bath, and the alloy layer is brittle due to excessive diffusion of the steel sheet Fe in proportion to steel composition, causing powdering defects.

In addition, in the case of Comparative Example 12 in which the content of Fe in the lower alloy layer was less than the condition of the present disclosure, the entering temperature exceeded the range of the present disclosure in the correlation between the entering temperature of the steel sheet and the temperature of the plating bath. An addition amount of trace components in the plating bath slightly deviates from the range of the present disclosure and the oxide breakdown effect due to the thermal shock that can occur in the process of immersing the steel sheet in the plating bath is insufficient and diffusion of the steel sheet Fe is not sufficiently performed and the thickness of the lower alloy layer is thin, such that the adhesion of the hot dip aluminum-plated layer was deteriorated.

In addition, in Comparative Example 13, the interfacial oxide breakage effect due to thermal shock did not occur as the correlation between the entering temperature of the steel sheet and the temperature of the plating bath deviated from the range of the present disclosure. As a result, diffusion of the steel sheet Fe into the plated layer did not occur smoothly, and the thickness of the lower alloy layer did not meet the conditions of the present disclosure, such that the adhesion of the hot dip aluminum-plated layer was deteriorated as in Comparative Example 7.

Finally, in Comparative Example 14, in a correlation between the entering temperature of the steel sheet and the temperature of the plating bath, the entering temperature slightly deviated from a lower limit of the present disclosure, resulting in an oxide breakdown effect due to thermal shock, and at the same time, reduction of Mn and Al oxides occur due to addition of the trace components. As diffusion of the steel sheet Fe was accelerated, a thickness of the lower alloy layer exceeded the condition of the present disclosure, and as a result of the excessive diffusion of the steel sheet Fe, a brittle alloy layer was formed thick as in the case of Comparative Example 6, and powdering occurred in the hot dip aluminum-plated layer.

Meanwhile, FIG. 1A is an image of a cross-section in which a high manganese hot dip aluminum-plated steel sheet according to Inventive Example 7 is cut and observed with a transmission electron microscope (TEM), FIG. 1B is an image observed by enlarging region A of FIG. 1A, and FIG. 1C is an image observed by enlarging region B of FIG. 1B. Referring to FIG. 1, it can be visually confirmed that a dual structure interface layer exists at the interface between the base steel sheet and the hot dip aluminum-based plated layer.

Figure 2:
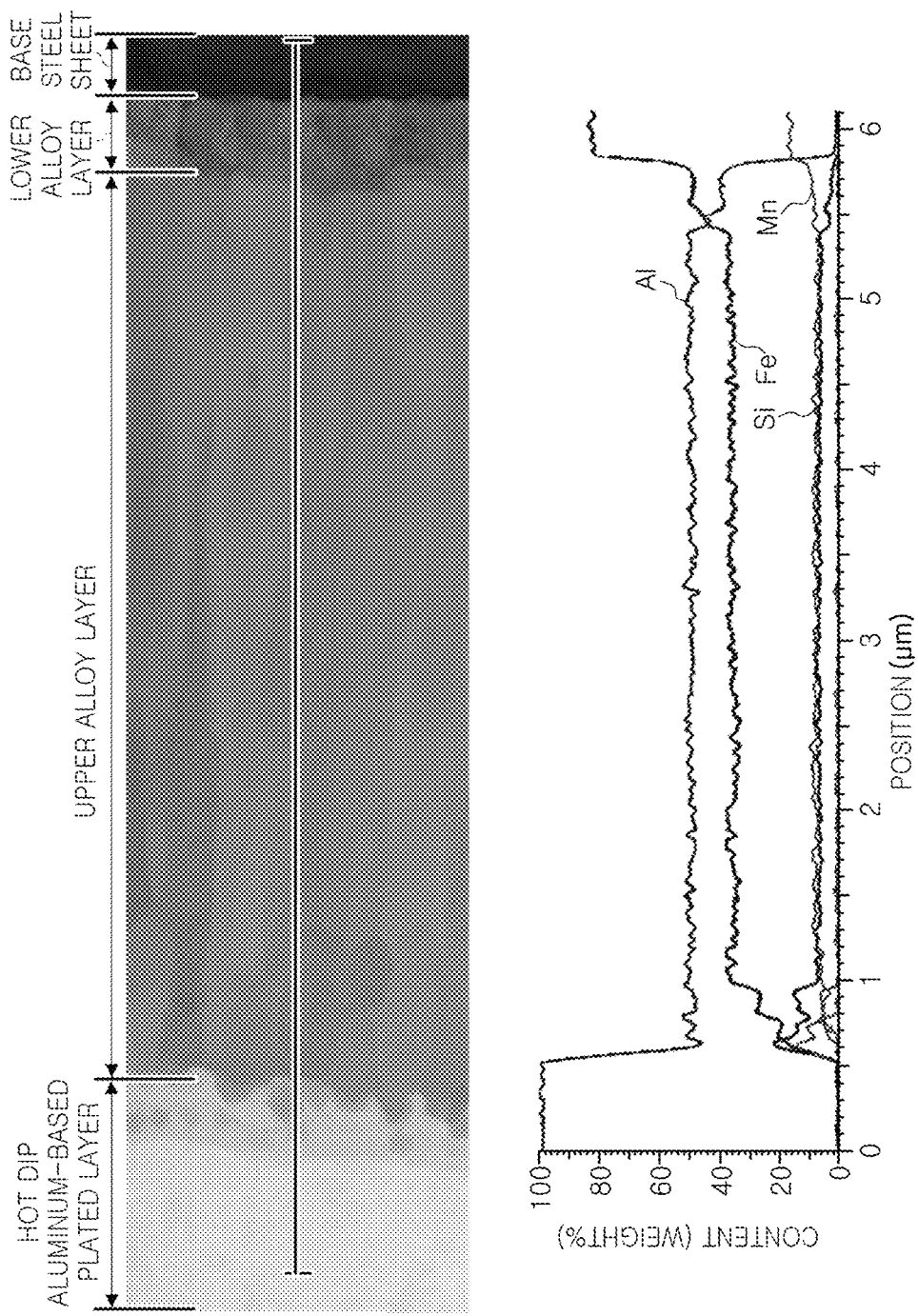
FIG. 2 is an image of a cross-section of a high manganese hot dip aluminum-plated steel sheet of Inventive Example 1 line-scanned by a transmission electron microscope attached with an energy dispersive spectrometer (EDS).

FIG. 2 is an image of a cross-section of a high manganese hot dip aluminum-plated steel sheet according to Inventive Example 7 line-scanned with a transmission electron microscope equipped with an energy dispersive spectrometer (EDS). Referring to FIG. 2, it can be visually confirmed that the contents of Fe and Si in the upper alloy layer and the lower alloy layer constituting the dual structure interface layer are different from each other.

While example embodiments have been shown and described above, it will be apparent to those skilled in the art that modifications and variations could be made without departing from the scope of the present inventive concept as defined by the appended claims.

The invention claimed is:

1. A high manganese hot dip aluminum-plated steel sheet comprising:
- a base steel sheet comprising, by wt %, 0.3 to 0.9% of C, 10 to 25% of Mn, 0.01 to 0.5% of Ti, 0.01 to 0.2% of Sn, 0.01 to 0.1% of Sb, and a balance of Fe and inevitable impurities;
- an aluminum-based plated layer formed on the base steel sheet and comprising 0.1 wt % 1.0 wt % or more of a sum of one or more among Li, K, Ca, Na, and Mg, and a balance of Al and inevitable impurities; and
- an Al—Fe—Si—Mn-based alloy layer formed between the base steel sheet and the aluminum-based plated layer, and having a dual structure,
- wherein the dual structure includes: a lower alloy layer formed on the base steel sheet; and an upper alloy layer formed on the lower alloy layer,
- wherein the lower alloy layer has an average Fe content of 50 wt % or more and an average Si content of less than 5 wt %, and
- wherein the upper alloy layer has an average Fe content of less than 50 wt % and an average Si content of 5 wt % or more.

2. The high manganese hot dip aluminum-plated steel sheet of claim 1, wherein the lower alloy layer has an average thickness of 0.2 to 0.8 μm, and the upper alloy layer has an average thickness of 1.5 to 8 μm.

3. The high manganese hot dip aluminum-plated steel sheet of claim 1, wherein an oxide including one or more of Si, Mn, and Al is discontinuously distributed on an interface of the base steel sheet and the Al—Fe—Si—Mn-based alloy layer, and the oxide has a linear fraction of 0.35 to 0.45, the linear fraction being defined by a value obtained by dividing a length of the oxide projected on the interface in a direction of a cross-section of the steel sheet by a length of the interface.

4. The high manganese hot dip aluminum-plated steel sheet of claim 1, wherein the aluminum-based plated layer further comprises 0.1 to 13 wt % of Si.

* * * * *